United States Patent [19]

Carruthers et al.

[11] 4,241,936
[45] Dec. 30, 1980

[54] TRAILER COUPLINGS

[75] Inventors: John A. Carruthers, 1/11 Pounamu Pl., Howick, Auckland, New Zealand; Michael J. Austin, Auckland, New Zealand

[73] Assignee: John Abbott Carruthers, Auckland, New Zealand

[21] Appl. No.: 937,205

[22] Filed: Aug. 28, 1978

[30] Foreign Application Priority Data

Sep. 1, 1977 [NZ] New Zealand ............... 185077

[51] Int. Cl.³ .............................................. B60D 1/06
[52] U.S. Cl. ................................... 280/507; 70/258; 280/511
[58] Field of Search ................ 280/507, 511, 512; 70/58, 258

[56] References Cited

U.S. PATENT DOCUMENTS

| | | | |
|---|---|---|---|
| 2,580,770 | 1/1952 | Harris | 280/512 |
| 2,693,970 | 11/1954 | Coleman et al. | 280/512 |
| 3,514,980 | 6/1970 | Doyle | 280/507 |
| 4,082,311 | 4/1978 | Hamman | 280/507 |

*Primary Examiner*—John J. Love
*Assistant Examiner*—Donn McGiehan
*Attorney, Agent, or Firm*—Holman & Stern

[57] ABSTRACT

A trailer coupling part which comprises a housing with a ball entry opening in the housing through which in use a towing ball is entered into the housing to complete the trailer coupling. A lever, provided with a handle, is pivotal in the housing between open and closed positions. A tongue, complementary contoured to the shape of the towing ball, is pivotal on the lever. When the towing ball is in position within the housing and the lever is in its closed position, the tongue contacts the towing ball to retain the latter in position within the housing. In the absence of a towing ball within the housing, and with the lever in an open position, the tongue automatically pivots through the ball entry opening in the housing. Moving the lever to the closed position causes the tongue to take up a position closing the ball entry opening.

3 Claims, 4 Drawing Figures

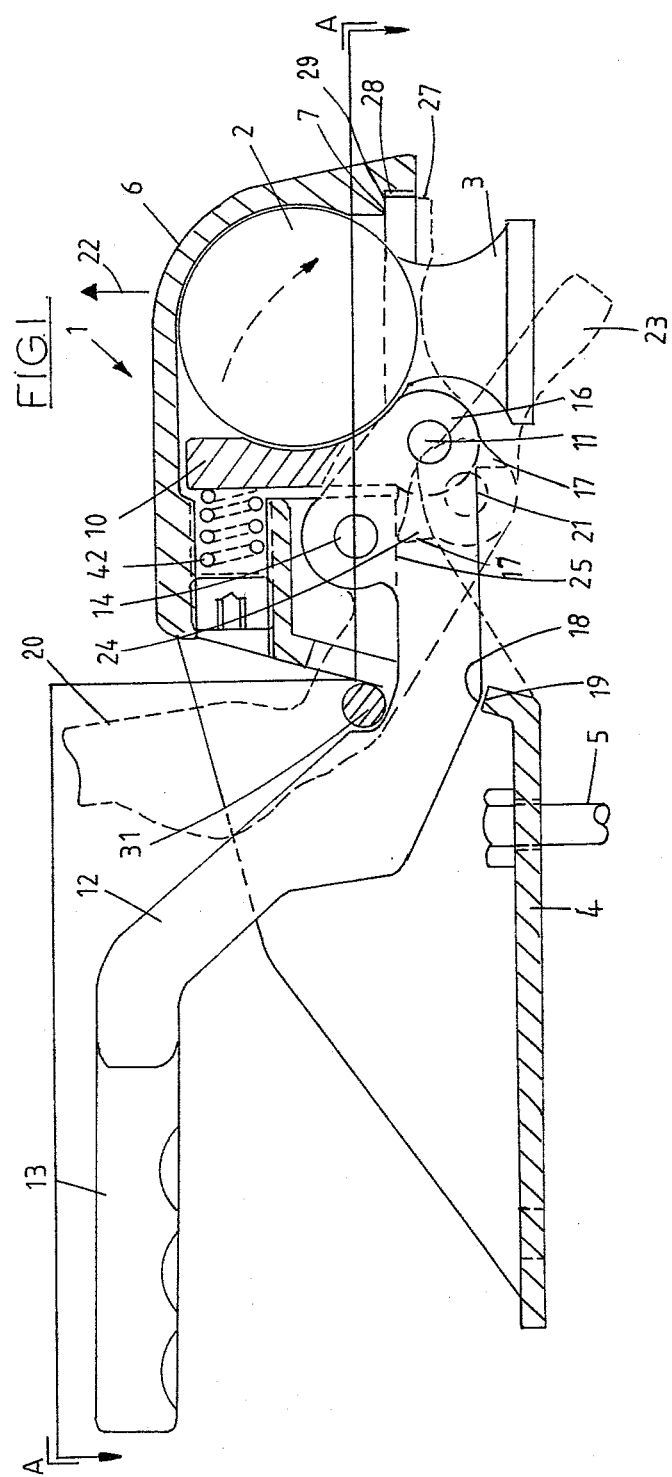

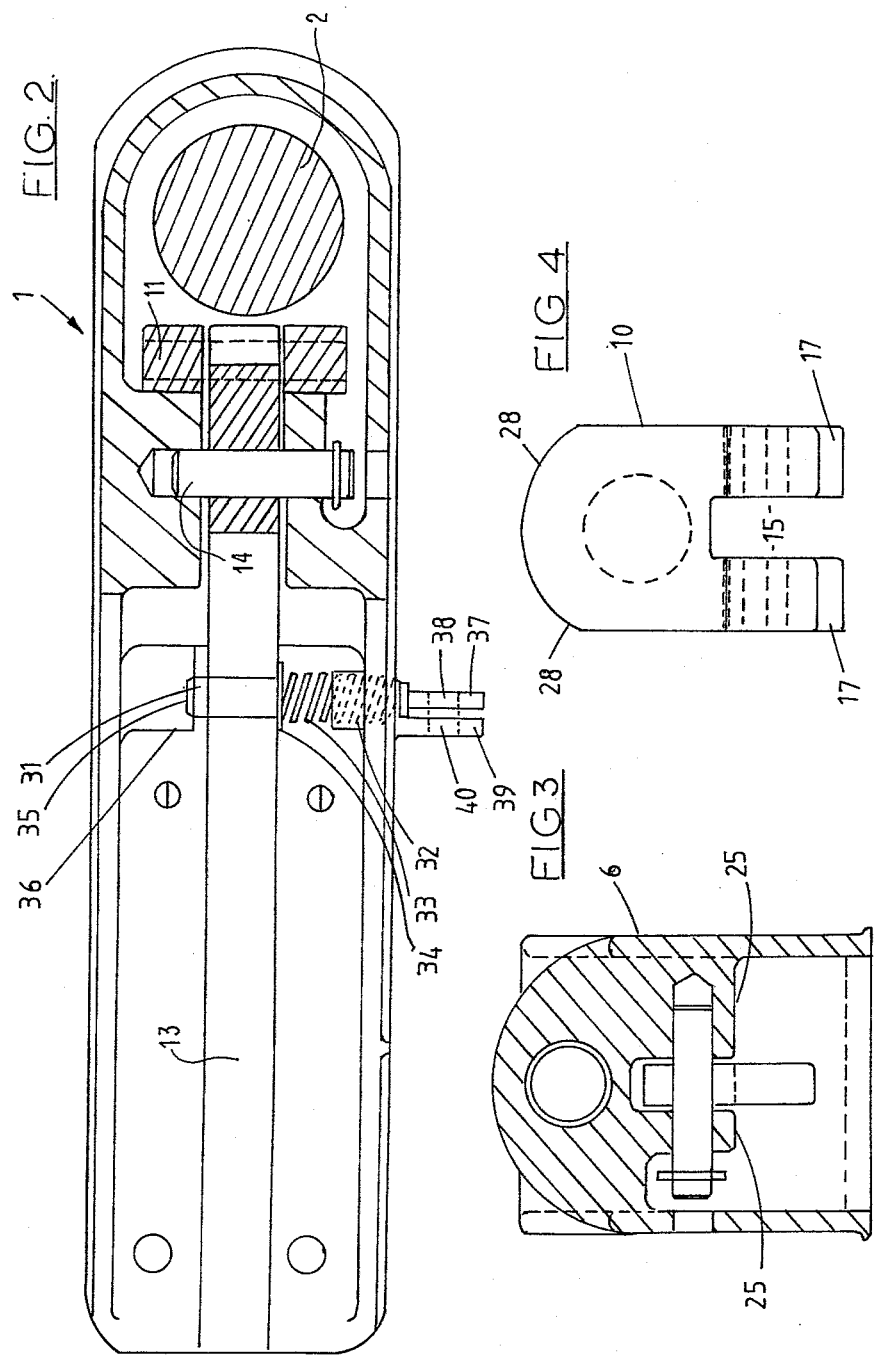

TRAILER COUPLINGS

BACKGROUND OF THE INVENTION

Field of the Invention

This invention relates to trailer couplings.

SUMMARY OF THE INVENTION

It is an object of the present invention to provide a trailer coupling which will at least provide the public with a useful choice.

Accordingly the invention consists in a trailer coupling part comprising a housing, a ball entry opening in said housing through which in use a towing ball is entered into said housing to complete the trailer coupling, a ball retaining means, manually operable means to move said ball retaining means between a first ball retaining position and a second position permitting ball release, closure means manually operable to close said ball entry opening against entry of a ball into said housing and locking means to lock said ball retaining means in its ball retaining position and to lock said closure in its position closing said ball entry opening.

To those skilled in the art to which this invention relates, many changes in construction and widely differing embodiments and applications of the invention will suggest themselves without departing from the scope of the invention as defined in the appended claims. The disclosures and the description herein are purely illustrative and are not intended to be in any sense limiting.

BRIEF DESCRIPTION OF THE DRAWINGS

One preferred form of the invention will now be described with reference to the accompanying drawings in which, FIG. 1 is a diagrammatic cross section of a trailer coupling according to the invention with some parts shown in pecked lines when in different positions from those parts shown in full lines, FIG. 2 is a cross section on the line A—A FIG. 1, FIG. 3 is a cross section on the line B—B FIG. 1, and FIG. 4 is a front view of the plate or tongue forming part of the construction shown in FIGS. 1 to 3.

DESCRIPTION OF THE PREFERRED EMBODIMENTS

Referring to the drawings, a trailer coupling according to the invention is made up of two parts, a female body part 1 and a standard ball part 2. The ball 2 has a neck 3 which is fixed, usually to a towing vehicle, in the usual way and the body 1 is fixed usually to the towed vehicle such as a trailer by the plate 4 being affixed to a tow bar, for example, with bolts 5 although having regard to the main purpose of the present invention such bolts are preferably either welded in position or have nuts welded on or the trailer coupling otherwise rendered not readily movable from the towed vehicle.

The coupling part 1 has a housing 6 and in the housing there is an opening 7 through which the towing ball 2 is entered into the housing.

A ball retaining means is provided as follows:

A plate or tongue 10 is pivoted at 11 to a manually operable lever 12 having a handle 13 the lever 12 being pivotal to the body 6 on a pivot 14. The tongue 10 is shaped in part to be complementary to the surface of ball 2 and is bifurcated at 15 (FIG. 4) to clear the lever 12. The boss 16 thereof has two extensions or nibs 17 one on either side of the bifurcation 15. When the tongue 10 is in the position shown in full lines in FIG. 1 it is in a ball retaining position, the pivot point 11 being in its fowardmost position (i.e. forwardmost having regard to the direction of travel of the combination of towing vehicle and trailer). The lever 12 and handle 13 are then in their downwardmost closed positions, further downward movement being restricted by contact of the part 18 of the lever 12 with part 19 of the body 1. If now the lever 12 is moved to the open position shown in pecked outlines and referenced 20 in FIG. 1, the pivot 11 is moved to position 21 and when this movement is accompanied by a separating action in which the body 1 is moved in the direction of the arrow 22, or the ball moved in the opposite direction, then the ball 2 is released from the housing 6. Furthermore the tongue 10 falls to position 23 being restrained from further movement by engaging of the nibs 17 when in position 24 with surfaces 25 on part of the housing 6. When the lever 12 and handle 13 are returned to the positions shown in full lines in FIG. 1, the tongue 10 now takes up a position shown in chain dotted lines 27 and the edge 28 of the tongue engages members 29 surrounding the ball entry open 7. In this position the tongue 10 acts as a closure means manually operable by the lever 12 and handle 13 to close the ball entry opening 7 against entry of the ball 2 into the housing.

To retain the lever in the closed position shown in full lines in FIG. 1 a locking means is provided as follows. A locking pin 31 (FIG. 2) extends from a housing 32 in the body 1 and is spring loaded by a spring 33 which bears against a washer or shoulder 34 on the pin and against the back of the housing 32. The end 35 of the pin 31 preferably enters a hole in a boss 36 in the body 1 so that the pin is securely retained. An extension 37 of the pin 31 has an aperture 38 and a bracket 39 on the body 1 has a further aperture 40 through which a padlock may be inserted to padlock the pin 31 in position and this position is such as to lock the lever 12 in its down position as shown in full lines in FIG. 1. This serves the dual purpose of locking the tongue 10 against the ball 2 when a ball is in position as shown in FIG. 1 and of locking the tongue 10 in its further position when it acts as a closure means with the edge 28 against the member 29 thus preventing entry of a ball into the housing 6.

When it is required to insert a ball into the housing 6 the lever is moved to the position 20 as a result of which the tongue 10 will move to position 23 and because the pivot point 11 is now in position 21 the tongue will clear the ledge 29 and if the tongue 10 is placed on a ball i.e. the housing 6 disposed above the ball the tongue will move to the position shown in full lines in FIG. 1. The lever 12 may then be moved to the closed position and locked in that position.

An anti-rattle spring 42 is provided bearing on part of the body 1 and against the tongue 10 to press the tongue against the ball when the ball 2 is in position, thus obviating or minimising rattling of the tongue which would be likely if the spring were not present.

From the foregoing it will be seen that a trailer coupling is provided, the female part of which has mechanism therein which at least in the preferred form obviates or minimises the possibility of the female part of the coupling being disconnected from a vehicle to which the female part is attached provided the lock is in position and also prevents the entry of a ball into the ball retaining housing 6 when the lever 12 is locked in its closed position shown in full lines in FIG. 1. This therefore obviates or minimises the possibility of the trailer or towable vehicle being stolen when left unattended both when the trailer is attached to the towing vehicle and when the trailer is detached and standing by itself.

Modifications of the above construction may be made, thus although as above described the tongue 10 falls into the position 23 on removal of a ball from the housing 6 it may be assisted in its movement by a biassing means comprising a spring interconnected between the body and the tongue 10. This spring may be either the spring 42 or if desired a further spring may be provided. Furthermore rather than providing a padlock a key operated mechanism may be provided directly onto pin 31.

We claim:

1. A trailer coupling part comprising: a housing so shaped as to define an entry opening adapted to receive a towing ball to complete the trailer coupling when in use; a lever pivotal in said housing between open and closed positions and having a handle; a tongue pivotal on said lever, said tongue having a shaped surface complementarily contoured to said towing ball, said shaped surface in use contacting said towing ball when the latter is in position in said housing; tongue biasing means biasing said tongue so that on movement of said lever to its open position and in the absence of a ball in said entry opening, said tongue automatically pivots down through said entry opening such that movement of said lever to its closed position causes said tongue to take up a position closing said ball entry opening.

2. The trailer coupling part as claimed in claim 1 having a locking means comprising a lockable latch which in use engages said lever to hold said lever in its closed position.

3. The trailer coupling part as claimed in claim 2 wherein said latch is lockable by arranging a padlock clasp in an aperture in part of said latch and in a further aperture in said housing to prevent movement of said latch.

* * * * *